(12) United States Patent
Compton et al.

(10) Patent No.: US 11,590,717 B2
(45) Date of Patent: Feb. 28, 2023

(54) EXTRUDABLE MAGNETIC INK AND NOVEL 3D PRINTING METHOD TO FABRICATE BONDED MAGNETS OF COMPLEX SHAPE

(71) Applicants: UT-Battelle, LLC, Oak Ridge, TN (US); Iowa State University Research Foundation, Inc., Ames, IA (US)

(72) Inventors: Brett G. Compton, Knoxville, TN (US); Mariappan Parans Paranthaman, Knoxville, TN (US); Orlando Rios, Knoxville, TN (US); Cajetan I. Nlebedim, Ames, IA (US)

(73) Assignees: UT-Battelle, LLC, Oak Ridge, TN (US); Iowa State University Research Foundation, Inc., Ames, IA (US)

( * ) Notice: Subject to any disclaimer, the term of this patent is extended or adjusted under 35 U.S.C. 154(b) by 279 days.

(21) Appl. No.: 15/439,423

(22) Filed: Feb. 22, 2017

(65) Prior Publication Data

US 2018/0236724 A1    Aug. 23, 2018

(51) Int. Cl.

| | |
|---|---|
| *B33Y 10/00* | (2015.01) |
| *B33Y 70/00* | (2020.01) |
| *B33Y 80/00* | (2015.01) |
| *B29C 70/58* | (2006.01) |
| *B29C 64/106* | (2017.01) |
| *H01F 1/00* | (2006.01) |
| *B29C 70/88* | (2006.01) |

(Continued)

(52) U.S. Cl.
CPC ............ *B29C 70/58* (2013.01); *B29C 64/106* (2017.08); *B29C 70/88* (2013.01); *H01F 1/00* (2013.01); *H01F 7/021* (2013.01); *B33Y 10/00* (2014.12); *B33Y 70/10* (2020.01); *B33Y 80/00* (2014.12)

(58) Field of Classification Search
CPC ...... B41M 3/14; B41M 7/0081; B41M 7/009; G07D 7/04; G11B 5/845; Y10S 283/904; Y10S 428/90; B29C 70/58; B29C 64/106; B29C 70/88; B33Y 80/00; B33Y 70/00; B33Y 10/00; H01F 7/021; H01F 1/00; H01F 41/0253; H01F 1/37
See application file for complete search history.

(56) References Cited

U.S. PATENT DOCUMENTS 3,639,188 A * 2/1972 Vogel ................... G11B 5/84
                                                      156/231
3,955,037 A * 5/1976 Marx .................. G11B 5/7022
                                                      428/418

(Continued)

OTHER PUBLICATIONS

Maka et al. (High performance epoxy composites cured with ionic liquids; Journal of Industrial and Engineering Chemistry, 31, 2015, 192-198; Maka) (Year: 2015).*

(Continued)

*Primary Examiner* — Francisco W Tschen
(74) *Attorney, Agent, or Firm* — Scully, Scott, Murphy & Presser, P.C.

(57) ABSTRACT

A magnetic ink composition for three-dimensional (3D) printing a bonded magnet is provided. The magnetic ink composition includes magnetic particles, a polymer binder and a solvent. A 3D printing method for fabrication of a bonded magnet using the magnetic ink composition is also provided.

24 Claims, 3 Drawing Sheets

(51) Int. Cl.
*H01F 7/02* (2006.01)
*B33Y 70/10* (2020.01)

(56) References Cited

U.S. PATENT DOCUMENTS

| | | | | |
|---|---|---|---|---|
| 4,043,297 | A * | 8/1977 | Hartmann | G11B 5/845 |
| | | | | 118/640 |
| 4,332,834 | A * | 6/1982 | Takei | G11B 5/845 |
| | | | | 427/128 |
| 4,673,602 | A * | 6/1987 | Nakayama | G11B 5/7305 |
| | | | | 369/288 |
| 4,680,130 | A * | 7/1987 | Hibst | B82Y 30/00 |
| | | | | 106/459 |
| 5,693,397 | A * | 12/1997 | Saito | G11B 5/70 |
| | | | | 428/329 |
| 5,843,329 | A * | 12/1998 | Deetz | G09F 7/04 |
| | | | | 106/460 |
| 5,981,054 | A * | 11/1999 | Hikosaka | G11B 5/64 |
| | | | | 204/192.2 |
| 2002/0084001 | A1 * | 7/2002 | Iwasaki | H01F 7/0268 |
| | | | | 148/105 |
| 2002/0102351 | A1 * | 8/2002 | Noguchi | G11B 5/70678 |
| | | | | 427/128 |
| 2002/0156189 | A1 * | 10/2002 | Ogura | H01L 23/293 |
| | | | | 525/107 |
| 2004/0001973 | A1 * | 1/2004 | Gao | H01F 1/0027 |
| | | | | 428/692.1 |
| 2005/0013046 | A1 * | 1/2005 | Noguchi | G11B 5/012 |
| | | | | 360/135 |
| 2006/0052505 | A1 * | 3/2006 | Pagilagan | C11D 17/042 |
| | | | | 524/445 |
| 2006/0137567 | A1 * | 6/2006 | Yadav | C09D 11/03 |
| | | | | 106/31.9 |
| 2010/0231433 | A1 * | 9/2010 | Tishin | C04B 38/02 |
| | | | | 342/1 |
| 2011/0011533 | A1 * | 1/2011 | Golden | C08G 59/38 |
| | | | | 156/330 |
| 2015/0352782 | A1 * | 12/2015 | Lisitsin | B29C 64/118 |
| | | | | 264/401 |
| 2018/0117818 | A1 * | 5/2018 | Paranthaman | B29C 48/0022 |
| 2018/0207863 | A1 * | 7/2018 | Porter | B29C 64/241 |

OTHER PUBLICATIONS https://www.palmerholland.com/getmedia/aebd549d-cf27-4769-a8a4-0b185e7770c8/MITM00421_1; Published 2013; Retrieved Mar. 26, 2022 (Year: 2013).*
https://mqitechnology.com/product/mqp-b-20173-prnd-b4/; Retrieved Mar. 26, 2022 (Year: 2022).*
Allnex, "EBECRYI ® 600 Bisphenol A Epoxy Diacrylate", Technical Data Sheet, Sep. 12, 2013, 2 pages.
Compton, B.G., et al., "Direct-write 3D printing of NdFeB bonded magnets", Materials and Manufacturing Processes, Received Apr. 20, 2016, Accepted Jul. 3, 2016, 5 pages.
Magnequench Technical Resource Website, "MQP-B-20173 (PrNd B4)", https://mqitechnology.com/product/mqp-3-20173-prnd-b4/, Printed on Mar. 26, 2022, 5 pages.
Maka, H., et al., "High performance epoxy composites cured with ionic liquids", Journal of Industrial and Engineering Chemistry (2015), Received Sep. 15, 2014, Received in revised form Jun. 8, 2015, Accepted Jun. 27, 2015, Available online Jul. 4, 2015, pp. 192-198, 31.

* cited by examiner

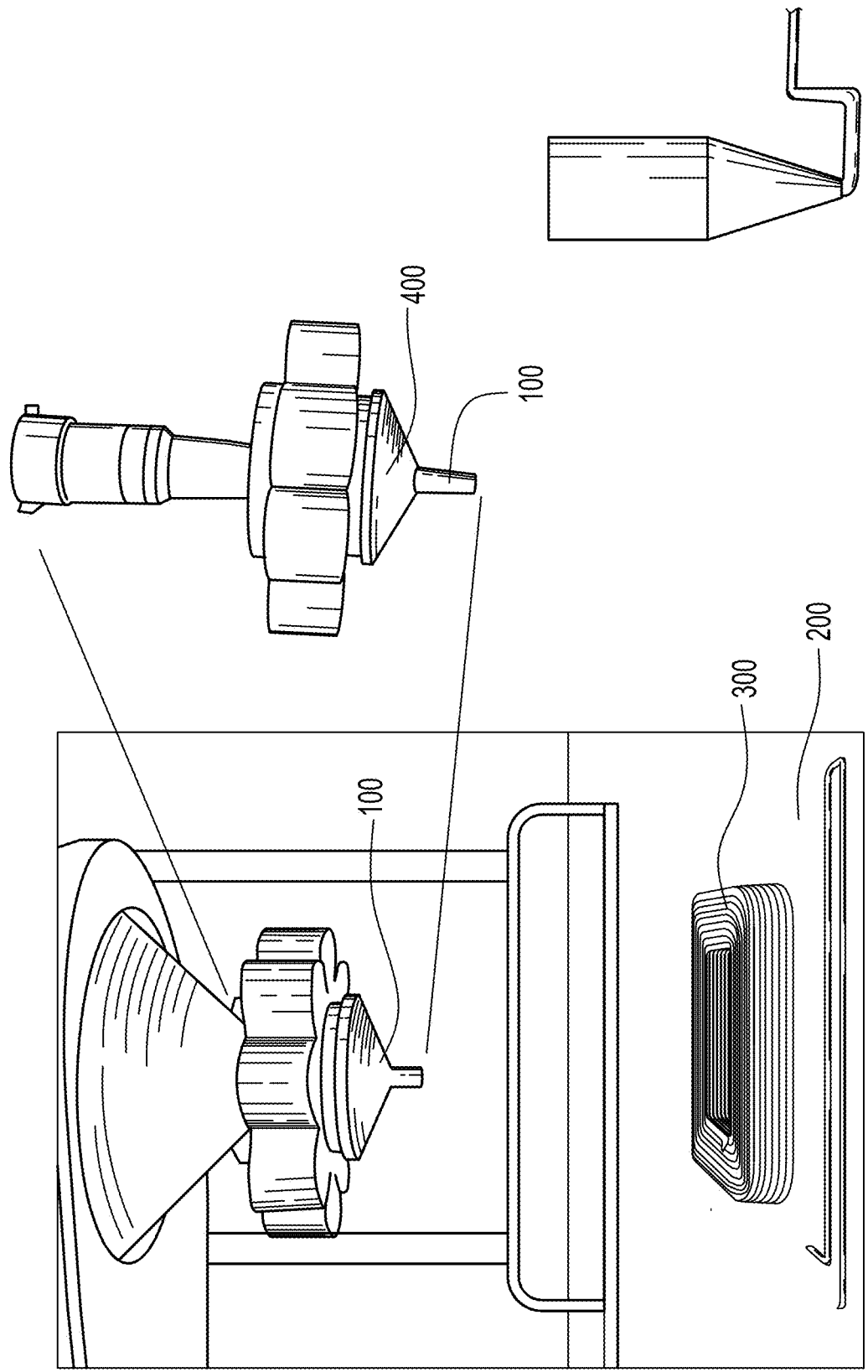

EXTRUDABLE MAGNETIC INK AND NOVEL 3D PRINTING METHOD TO FABRICATE BONDED MAGNETS OF COMPLEX SHAPE

This invention was made with government support under Prime Contract No. DE-AC05-000R22725 Mod 877 and DE-AC02-CH11358, both awarded by the U.S. Department of Energy. The government has certain rights in the invention.

FIELD OF THE INVENTION

The present invention relates to three-dimensional (3D) printing, and more particularly to magnetic ink compositions for 3D printing bonded magnets and methods of using magnetic ink compositions for 3D printing bonded magnets.

BACKGROUND OF THE INVENTION

Bonded magnets have received continuous attention due to their advantages such as intricate shapes, low weight and cost, superior mechanical properties and corrosion resistance. Applications for bonded magnets are numerous, including computer hard disk drives, motors, sensors in automobile air bags, and consumer electronics. Traditionally, the bonded magnets are produced by mixing magnetic powders with a polymer binder, and the mixture is molded into desired shapes using injection molding, compression molding, calendaring, or extrusion molding. However, these conventional fabrication techniques require specific tooling for each design, which increases fabrication cost and imposes limits in shape flexibility and complexity.

Three-dimensional (3D) printing, also known as additive manufacturing, is an emerging technology that allows building 3D objects of almost any shape from a computer-aided design (CAD) model through additive processes in which successive layers of material are laid down under computer control. 3D printing offers unparalleled flexibility in achievable geometric shape and complexity over existing manufacturing techniques. Therefore, it is highly desirable to fabricate bonded magnets using 3D printing.

SUMMARY OF THE INVENTION

The present invention provides magnetic ink compositions for 3D printing bonded magnets, methods of preparing these magnetic ink compositions and using these magnetic ink compositions for 3D printing bonded magnets.

In one aspect, a magnetic ink composition for 3D printing a bonded magnet is provided. The magnetic ink composition includes magnetic particles, a polymer binder and a solvent.

In another aspect, a method of printing a bonded magnet is provided. The method includes extruding a magnetic ink composition through a nozzle and depositing a continuous filament containing the magnetic ink composition on a substrate. The magnetic ink composition includes magnetic particles, a polymer binder, and a solvent.

In yet another aspect, a method of formulating a magnetic ink composition for 3D printing a bonded magnet is provided. The method includes mixing magnetic particles with a polymer binder and mixing a solvent with a mixture of the magnetic particles and the polymer binder.

BRIEF DESCRIPTION OF THE DRAWINGS

FIG. 1A shows an exemplary 3D printing process where a magnetic ink formulation is extruded through a nozzle to form a filament that is deposited on a substrate in a predetermined square ring pattern; the inset shows a nozzle tip concentrically surrounded by a permanent magnet.

FIG. 1B is a schematic of the 3D printing process.

DETAILED DESCRIPTION OF THE INVENTION

Figure 2A:
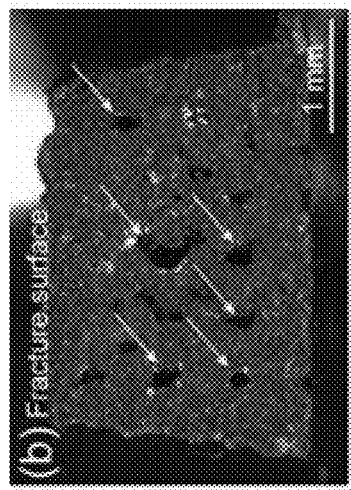
FIG. 2A shows a 3D printed bar-shaped boned magnet fabricated from an exemplary magnetic ink composition including NdFeB magnetic particles and epoxy resin.

In one aspect, the present invention is directed to a magnetic ink composition for 3D printing a bonded magnet. The magnetic ink composition includes magnetic particles, a polymer binder and a solvent.

The magnetic particles useful in the present invention can be isotropic magnetic particles or anisotropic magnetic particles. Anisotropic magnetic particles can have either or both of magnetocrystalline anisotropy and shape anisotropy. The magnetic particles that can be employed in the present invention are not particularly limited and may be appropriately selected from those in the art depending on the intended purpose. For example, the magnetic particles may include rare earth magnetic particles, ferrite magnetic particles or iron (Fe) particles. These magnetic particles can be used as one kind alone and also as a mixture of two or more kinds.

The rare earth magnetic particles useful in the present invention include at least one rare earth metal selected from Neodymium (Nd), Samarium (Sm), Gadolinium (Gd), Terbium (Tb), Cerium (Ce), Praseodymium (Pr), Dysprosium (Dy), Holmium (Ho), Erbium (Er), Thulium (Tm), and Ytterbium (Yb), and at least one transition metal selected from Fe, cobalt (Co), nickel (Ni), Niobium (Nb), and Manganese (Mn). Examples of rare earth magnetic particles that can be employed in the present invention include, but are not limited to, Nd—Fe—B, Sm—Co and Sm—Fe—N.

The ferrite magnetic particles useful in the present invention include those derived from hexagonal ferrites containing barium (Ba), strontium (Sr), lead (Pb) and lanthanum (La), a compound ($MO—Fe_2O_3$) composed of ferric oxide ($Fe_2O_3$) and an oxide of a divalent metal (MO). Examples of divalent metals that can be employed in the present invention include, but are not limited to, barium (Ba), Mn, Ni, copper (Cu), and magnesium (Mg). Other non-rare earth magnetic particles such as, for example, Fe—N and Alnico can also be employed.

The sizes of the magnetic particles may vary, but are generally small enough to be extruded through a nozzle. Typically, the magnetic particles have sizes of no greater than about 1 mm. In one set of embodiments, the magnetic particles are nanoparticles. The nanoparticles have a size in one, two, or all of their dimensions of less than 1 μm, and more typically, a size up to or less than 500 nm, 250 nm, or 100 nm. In different embodiments, the magnetic nanoparticles have a uniform or average size of precisely, about, up to, or less than, for example, 100 nm, 150 nm, 200 nm, 300 nm, 400 nm, 500 nm, 600 nm, 700 nm, 800 nm, or 900 nm, or a size within a range bounded by any two of the foregoing values, or between any of the foregoing values and less than 1 μm. In another set of embodiments, the magnetic particles are microparticles, which may correspond to a uniform or average size (in one, two, or all of their dimensions) of precisely, about, up to, less than, at least, or above, for example, 1 μm, 2 μm, 5 μm, 10 μm, 20 μm, 50 μm, 100 μm, or 200 μm. In another set of embodiments, the magnetic particles are macroparticles, which may correspond to a uniform or average size (in one, two, or all of their dimensions) of precisely, about, up to, less than, at least, or above, for example, 500 μm, 1000 μm, 2000 μm, 3000 μm, 4000 μm, or 5000 μm. In another set of embodiments, the magnetic particles have a size within a range that overlaps any of the nanoparticle, microparticle, or macroparticle sizes provided above.

As used herein, the term "about" generally indicates within ±0.5%, 1%, 2%, 5%, or up to ±10% of the indicated value. For example, a particle size of "about 100 nm" generally indicates, in its broadest sense, 100 nm±10%, which indicates 100±10 nm. In addition, the term "about" can indicate either a measurement error (i.e., by limitations in the measurement method), or alternatively, a variation or average in a physical characteristic of a group (e.g., a population of particle sizes).

The magnetic particles can also have any of a variety of shapes. In one embodiment, the magnetic particles are substantially spherical or ovoid. In another embodiment, the magnetic particles are substantially elongated, and may be rod-shaped, tubular, or even fibrous. In yet another embodiment, the magnetic particles are plate-like, with one dimension significantly smaller than the other two. In still another embodiment, the magnetic particles have a substantially polyhedral shape, such as a pyramidal, cuboidal, rectangular, or prismatic shape.

The magnetic particles make up a substantial portion of the magnetic ink composition. The magnetic particles may be present in the magnetic ink composition at an amount from about 35 to 70 vol. %, based on the total volume of the magnetic ink composition, preferably from about 45 to 70 vol. %, and more preferably from about 55 to 70 vol. %.

The polymer binder useful in the present invention includes a thermoplastic resin, a thermosetting resin, or an elastomer. In one embodiment, the polymer binder includes a thermoplastic resin such as, for example, a polystyrene resin, a polycarbonate resin, or an acrylic resin. In another embodiment, the polymer binder includes a thermosetting resin such as, for example, an epoxy resin, a polyurethane resin, a polyester resin, a polyimide resin, or a polydimethylsiloxane (PDMS) resin that undergoes a cross-linking process when cured. In yet another embodiment, the polymer binder includes an elastomer such as, for example, an ethylene-propylene rubber, a polybutadiene rubber, a styrene-butadiene rubber, a chloroprene rubber, or a styrene-butadiene-styrene block copolymer. The polymers may be used alone or in combination.

The polymer binder may be present in the magnetic ink composition at an amount from about 20 to 70 vol. %, based on the total volume of the magnetic ink composition, preferably from about 30 to 50 vol. %, and more preferably from about 30 to 45 vol. %.

The solvent in the magnetic ink composition is employed to facilitate the mixing of the various components of the magnetic ink composition prior to deposition and to reduce the propensity of extruded filament to "curl up" against the nozzle during deposition. Suitable solvents that can be employed in the present invention include, but are not limited to, acetone, ethanol, methanol, or hexane. The solvent may have a concentration from about 0.25 to 10 parts per hundred (pph), based on the mass of the polymer binder in the magnetic ink composition.

Additionally, the magnetic ink composition may further include a latent curing agent for curing the polymer binder. The latent curing agent used in the magnetic ink composition of the present invention prevents premature curing of the polymer binder; typically, curing is activated by heat exposure after layers of continuous filament have been printed. The latent curing agent incorporated in the magnetic ink composition may be activated at elevated temperatures ranging from 100° C. to 250° C. In some embodiments, the latent curing agents may also be activated by electromagnetic radiation (e.g., UV illumination) instead of heat. Suitable latent curing agents that can be employed in the present invention include, but are not limited to, dicyandiamide, phenol novolac, adipic dihydrazide, diallyl melamine, diamino maleonitrile, $BF_3$-amine complex, amine salts, and imidazole derivatives. In one embodiment of the present invention, an imidazole derivative, 1-ethyl-3-methylimidazolium-dicyanimide, is used as a curing agent when an epoxy resin is used as the polymer binder.

The latent curing agent may be present in the magnetic ink composition at an amount from about 1 to 10 pph, based on the mass of the polymer binder in the magnetic ink composition, preferably from about 2 to 8 pph, and more preferably from about 2 to 6 pph.

Moreover, the magnetic ink composition of the present invention may further include a viscosifier. The viscosifier acts as a rheology modifier, imparting the viscoelastic, shear thinning behavior that is necessary for 3D printing. Suitable viscosifiers that can be employed in the present invention includes, but not limited to, nanoclay platelets, fumed silica, fumed alumina, polyethylene oxide, and polypropylene oxide.

The viscosifier may be present in the magnetic ink composition at an amount from about 1 to 20 vol. %, based on the total volume of the magnetic ink composition, preferably from about 1 to 15 vol. %, and more preferably from about 1 to 10 vol. %.

In another aspect, the present invention is directed to a method of formulating the magnetic ink composition described above. The magnetic ink composition can be produced by mixing the respective components including magnetic particles and a polymer binder, and in some embodiments a latent curing agent and a viscosifier, first and then mixing the resulting mixture with a solvent. To ensure uniform dispersion of the magnetic particles in the polymer binder, the magnetic particles can be introduced into the polymer binder in two or more portions. In instances where the magnetic ink composition includes a latent curing agent, the latent curing agent can be pre-mixed with the polymer binder before adding the magnetic particles into the polymer binder.

The magnetic ink compositions of the present invention are storage stable. For example, the magnetic ink compositions can be stored for a period of 1.5 months at room temperature without observable separation of the ink composition components and/or any change in morphology of the polymer binder.

The magnetic ink composition of the present invention that is comprised of isotropic and/or anisotropic magnetic particles can be used to print bonded magnets using a 3D printer through layer-by-layer deposition. In yet another aspect, the invention is directed to a method of forming a bonded magnet using the magnetic ink composition of the present invention through a 3D printing process. FIGS. 1A and 1B shown schematics of the 3D printing process, which may also be referred to as direct-write fabrication. As shown, the magnetic ink composition is loaded into an ink cartridge (not shown) of a 3D printer and extruded through a nozzle 100 via pneumatic or mechanical pressure at a room temperature. Upon extrusion, the solvent evaporates and a solid, continuous filament is formed on a substrate 200 in a predetermined pattern layer by layer, thus forming stacks or layers of continuous filament 300. The nozzle 100 may be moved with respect to the substrate 200 during deposition (i.e., either the nozzle 100 may be moved or the substrate 200 may be moved, or both may be moved to cause relative motion between the nozzle 100 and the substrate 200). For anisotropic magnetic particles, to ensure the magnetic particles are aligned in a same direction, every filament is deposited with the nozzle traveling in the same direction.

In instances where the anisotropic magnetic particles are employed in the magnetic ink composition, to augment the particle alignment imparted due to shear flow, in one embodiment and as shown in FIG. 1A, an assembly of permanent magnets 400 can be disposed concentrically around the nozzle 100. The concentric pattern ensures that only a moment is applied to the magnetic particles to increase alignment as the magnetic particles flow out the nozzle 100. The particular arrangement of the permanent magnets 400 can be tailored to fit any desired nozzle. In addition, this design can readily be extended to include a concentric electromagnet surrounding the nozzle, thus enabling time-varying magnetic fields during printing to further increase magnetic particle alignment and to achieve spatial variations in aligned magnetic particles in resulting bonded magnets. In another embodiment, a mold surrounded by an assembly of permanent magnets or an electromagnet that creates a magnetic filed having a desired magnetic field geometry can be used (not shown). The mold is typically kept at a temperature ranging from room temperature to 120° C., and preferably at a temperature ranging from 60° C. to 100° C. The magnetic filed applied on the mold facilitates the proper alignment of the magnetic particles as the layers of continuous filament are formed within the mold. In this case, the magnets surrounding the nozzle 100 may no longer be needed.

To further augment the magnetic particle alignment, in some embodiments of the present invention, before supplying the magnetic ink composition into the nozzle, a magnetic field may be applied to pre-align the magnetic particles.

In instances where the magnetic ink of the present invention includes a latent curing agent, the continuous filament may be cured after deposition is completed. For example, the curing may be carried out after all of the stacks or layers of continuous filament have been formed. The curing may be effected by heating the continuous filament comprised of the magnetic ink composition for a period of time at a temperature ranging from about 100° C. to about 250° C. under ambient atmosphere. Other curing conditions and methods can be used in the curing step, including electromagnetic radiation (e.g., UV curing).

Exemplary embodiments of the present invention are described in further detail with reference to the following example. However, this example is for illustrative purposes only and is not intended to limit the scope of the present invention.

EXAMPLE

Magnetic Ink Composition: The magnetic ink composition is comprised of Epon 862 epoxy resin (Momentive), MQA 38-14 NdFeB magnetic particles (Molycorp Magnequench), Cloisite 15A nanoclay platelets (BYK) acting as a viscosifier, and 1-ethyl-3-methylimidazolium-dicyanimide (Basionics VS03, BASF) acting as a latent curing agent. The detailed ink magnetic ink composition is listed in Table 1.

TABLE 1

Magnetic Ink Composition*

| Constituent | Density (g/cc) | Batch mass (g) | Mass fraction | Volume fraction |
|---|---|---|---|---|
| Epon 862 resin | 1.174 | 20 | 0.172 | 0.518 |
| MQA particles | 7.51 | 90 | 0.776 | 0.365 |
| Cloisite 15A | 1.66 | 5 | 0.043 | 0.072 |
| VS03 curing agent | 1.20 | 1 | 0.009 | 0.025 |
| Total | 3.53 | 116 | 1.0 | 1.0 |

*One gram of acetone was also added to aid in mixing and deposition which was not included in the weight and volume fraction calculation.

Ink Formulation: The magnetic ink composition is formulated by first adding 1.0 g VS03 curing agent to 20 g of Epon resin and mixing in a planetary centrifugal mixer (Thinky ARV-310, Thinky USA, Inc.), under ambient atmosphere for 30 seconds. After this premix, the MQA particles are added in two 45 g increments with 60 seconds of mixing under ambient atmosphere for each addition. Next, the nano-clay is added and mixed for 60 seconds under ambient atmosphere. Finally, about 1 g of acetone is added and the ink is mixed at 20 kPa vacuum (0.2 Bar) for 60 seconds.

Printing: The magnetic ink composition is then loaded into a plastic syringe with a luer-lock needle tip (EFD Nordson). The syringe is mounted to a 3-axis motorized gantry system (Solidoodle) with a custom-made syringe holder. Deposition is achieved through the application of air pressure, and the stage motion and pressure modulation are controlled with G-code commands using Repetier-Host software (repetier.com). In some instances, the tool path was programmed directly in G-code, and in other instances, the G-code was generated automatically from 3D computer models using Slic3r (slic3r.org) tool path generation software. The latter approach is the standard process used for conventional fused deposition modeling (FDM) 3D printing of thermoplastic materials. Finally, after printing onto Bytac PTFE-coated aluminum foil substrates (Saint Gobain), the printed parts were cured in an oven in air at 100° C. for 15 hours.

Characterization: Magnetization of printed bonded magnets was measured in a vibrating sample magnetometer (VSM) with the magnetic field applied parallel to the printing direction.

Figure 2B:
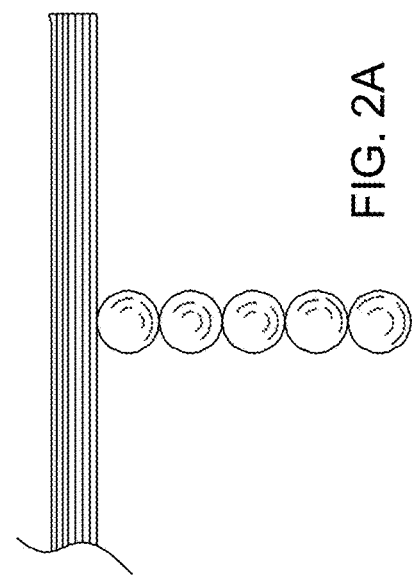
FIG. 2B shows fracture surface of the printed boned magnet showing good coalescence of the printed filaments and some residual porosity, indicated by white arrow.
Figure 2E:
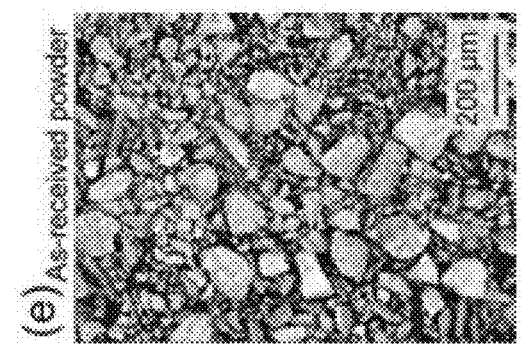
FIG. 2E is a scanning electron microscopy (SEM) image of the as-received NdFeB magnetic particles for comparison.
Figure 2D:
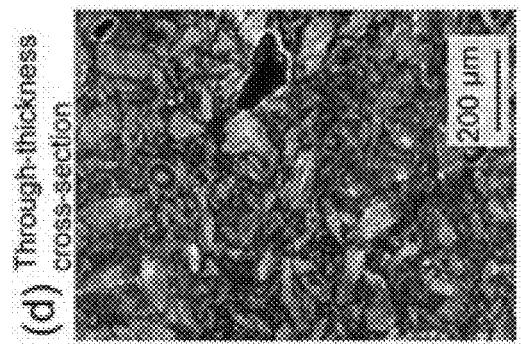
FIGS. 2C-2D are polished optical micrographs of the printed boned magnet in (c) in-plane orientation and (d) through thickness, respectively.
Figure 2C:
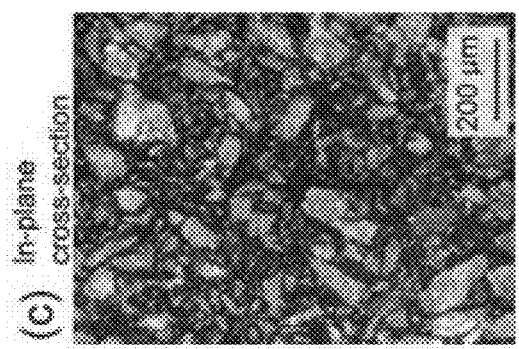

To establish successful deposition parameters and investigate the effects of mixing, deposition, and curing on the microstructure of the printed bonded magnets, simple rectangular bars were printed. The representative printed bar and a fractured surface of the bar are shown in FIG. 2A and FIG. 2B. FIG. 2C reveals some porosity trapped between filaments during deposition, but otherwise, no discrete interfaces between filaments can be identified. Because this printing method is performed at room temperature and the components are printed completely before curing, the epoxy resin forms physical crosslinks between layers, which can result in significantly better transverse strength, compared to conventional FDM. In conventional FDM, molten thermoplastics are deposited onto a cooler solidified layers and the bond strength between filaments is typically poor. Optical micrographs of polished sections are shown in FIG. 2C and FIG. 2D for in-plane orientation and through-thickness, respectively. A scanning electron micrograph (SEM) of the as-received MQA powder is shown in FIG. 2E at the same scale for comparison. The micrographs indicate uniform dispersion of the magnetic particles in the printed bonded magnet and no discernable change in morphology or size throughout the mixing and deposition process.

Figure 3A:
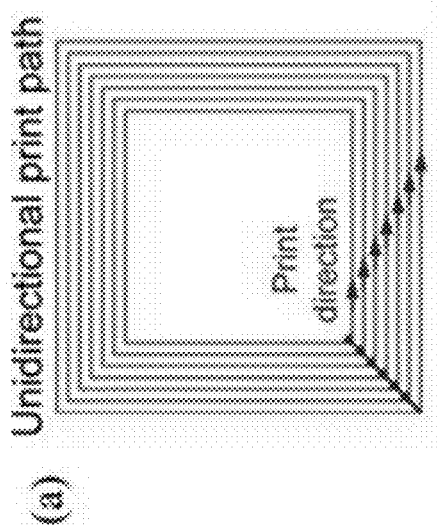
FIG. 3A is a top view of a software-generated square ring geometry for magnetic measurements.
Figure 3B:
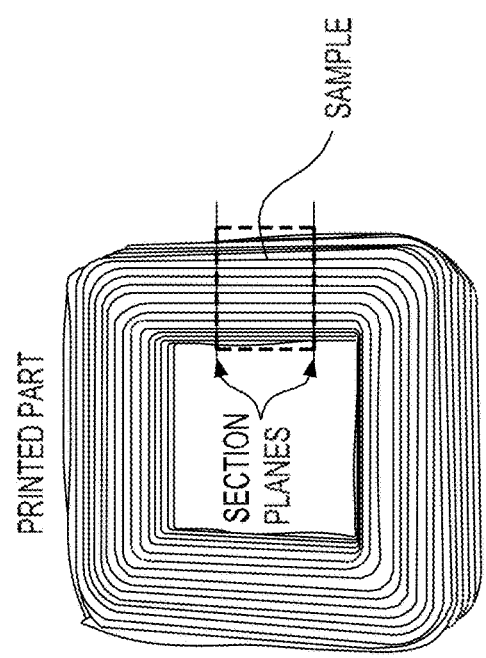
FIG. 3B shows a bonded magnet printed from the software-generated square ring geometry.
Figure 3C:
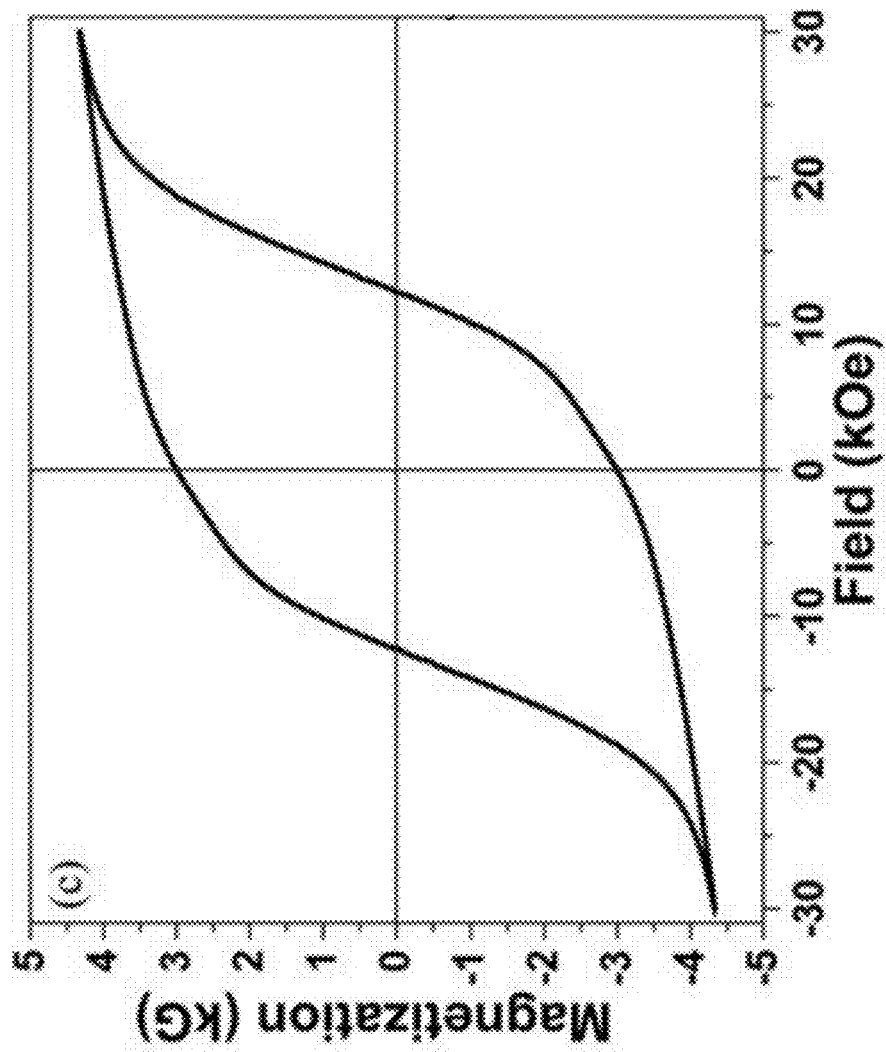
FIG. 3C shows a measured magnetic hysteresis loop for the 3D printed bonded magnet.

Software-generated print paths are typically comprised of concentric perimeters and rectilinear raster infill patterns between the perimeters. Because this raster pattern would result in anti-aligned neighboring filaments that could potentially disrupt any alignment of the magnetic particles that may occur during deposition, a novel print path geometry was devised and programmed in G-code directly. The geometry consists of concentric square rings printed in a continuous counter-clockwise spiral path so that every filament is deposited with the nozzle traveling in the same direction. The print path is shown schematically in FIG. 3A and the resulting printed part is shown in FIG. 3B. From the straight regions of these printed parts, samples were sectioned for magnetic characterization, as indicated in FIG. 3B. The measured magnetic hysteresis loop is shown in FIG. 3C. The plot is indicative of a bonded magnet containing about 40 vol. % of the NdFeB magnetic particles. Thus, the formulation, deposition, and curing processes do not negatively affect the performance of 3D-printed bonded magnets.

While there have been shown and described what are at present considered the preferred embodiments of the invention, those skilled in the art may make various changes and modifications which remain within the scope of the invention defined by the appended claims.

What is claimed is:
1. An extrudable magnetic ink composition for printing a bonded magnet comprising:
magnetic particles having a particle size of at least 500 microns, wherein the magnetic particles are present in the magnetic ink composition in an amount of 35% to 70% by volume;
an epoxy polymer binder;
a latent curing agent comprising an imidazole derivative containing a dicyanimide;
viscosifier; and
a solvent,
wherein the amount of magnetic particles along with viscosifier together impart the extrudable magnetic ink composition with a viscoelastic shear thinning behavior for applying the extrudable magnetic ink composition as a feed material in 3D printing.

2. The magnetic ink composition of claim 1, wherein the magnetic particles comprise rare earth magnetic particles or ferrite magnetic particles.

3. The magnetic ink composition of claim 1, wherein the epoxy polymer binder comprises a thermoplastic resin, a thermosetting resin or an elastomer, or combinations thereof.

4. The magnetic ink composition of claim 1, wherein the viscosifier comprises nanoclay platelets, fumed silica, fumed alumina, polyethylene oxide, or polypropylene oxide.

5. The magnetic ink composition of claim 1, wherein the solvent comprises acetone, ethanol, methanol, or hexane.

6. The magnetic ink composition of claim 1, wherein the latent curing agent is 1-ethyl-3-methylimidazolium-dicyanimide.

7. The magnetic ink composition of claim 1, wherein the magnetic particles comprise rare earth magnetic particles.

8. The magnetic ink composition of claim 1, wherein the amount of the magnetic particles in the magnetic ink composition is from 45% to 70% by volume.

9. The magnetic ink composition of claim 1, wherein the viscosifier comprises nanoclay platelets, fumed silica, or fumed alumina.

10. The magnetic ink composition of claim 1, wherein the viscosifier comprises nanoclay platelets.

11. A method of printing a bonded magnet comprising: extruding a magnetic ink composition according to claim 1 through a nozzle; and depositing one or more continuous filaments comprising the magnetic ink composition on a substrate.

12. The method of claim 11, further comprising surrounding the nozzle with at least one magnet, wherein the at least one magnet is concentrically assembled around the nozzle.

13. The method of claim 12, wherein the at least one magnet comprises one or more permanent magnets or one or more electromagnets.

14. The method of claim 11, wherein the one or more continuous filaments are deposited in a predetermined pattern on the substrate.

15. The method of claim 11, wherein the magnetic ink composition is extruded through the nozzle at a room temperature.

16. The method of claim 11, further comprising curing the one or more continuous filaments.

17. The method of claim 16, wherein curing the one or more continuous filaments is performed at an elevated temperature ranging from 100° C. to 250° C. under an ambient atmosphere.

18. The method of claim 11, further comprising prealigning the magnetic particles under a magnetic field before supplying the magnetic ink composition into the nozzle.

19. The method of claim 11, wherein the substrate is a mold under a magnetic filed.

20. The method of claim 11, wherein the magnetic particles comprise rare earth magnetic particles or ferrite magnetic particles.

21. The method of claim 11, wherein the epoxy polymer binder comprises a thermoplastic resin, a thermosetting resin or an elastomer, or combinations thereof.

22. The method of claim 11, wherein the viscosifier comprises nanoclay platelets, fumed silica, fumed alumina, polyethylene oxide, or polypropylene oxide.

23. The method of claim 11, wherein the solvent comprises acetone, ethanol, methanol, or hexane.

24. An extrudable magnetic ink composition for printing a bonded magnet, the composition consisting of:
magnetic particles having a particle size of at least 500 microns;
an epoxy polymer binder present in the extrudable magnetic ink composition in an amount of about 20 vol %;
optionally, a latent curing agent comprising an imidazole derivative containing a dicyanimide present in the extrudable magnetic ink composition in an amount of about 1 pph based on the mass of the epoxy polymer binder;

viscosifier selected from the group consisting of nanoclay platelets and fumed silica and present in the extrudable magnetic ink composition in an amount of about 1 vol %; and a solvent present in the extrudable magnetic ink composition in an amount of about 0.25 pph based on the mass of the epoxy polymer binder;

wherein the amount of magnetic particles along with viscosifier together impart the extrudable magnetic ink composition with a viscoelastic shear thinning behavior for applying the extrudable magnetic ink composition as a feed material in 3D printing.

* * * * *